US012754424B1

(12) United States Patent
Born et al.

(10) Patent No.: US 12,754,424 B1
(45) Date of Patent: Oct. 6, 2026

(54) DISPLAY DEVICES WITH ONE-DIMENSIONAL PUPIL REPLICATION

(71) Applicant: Apple Inc., Cupertino, CA (US)

(72) Inventors: Brandon Born, Sunnyvale, CA (US); Gaurav Bose, Espoo (FI); Ciaran P Phelan, Wallingford (GB); Choon How Gan, Cheltenham (GB)

(73) Assignee: Apple Inc., Cupertino, CA (US)

( * ) Notice: Subject to any disclaimer, the term of this patent is extended or adjusted under 35 U.S.C. 154(b) by 343 days.

(21) Appl. No.: 18/468,425

(22) Filed: Sep. 15, 2023

Related U.S. Application Data

(60) Provisional application No. 63/409,400, filed on Sep. 23, 2022.

(51) Int. Cl.
*G02B 27/01* (2006.01)

(52) U.S. Cl.
CPC .. *G02B 27/0172* (2013.01); *G02B 2027/0118* (2013.01); *G02B 2027/0174* (2013.01)

(58) Field of Classification Search
CPC ........................ G02B 27/0081; G02B 27/0172
See application file for complete search history.

(56) References Cited

U.S. PATENT DOCUMENTS

| | | | | |
|---|---|---|---|---|
| 8,903,207 | B1 * | 12/2014 | Brown | G02B 27/0103 359/6 |
| 10,317,679 | B2 | 6/2019 | Ayres et al. | |
| 11,009,704 | B2 | 5/2021 | Ayres et al. | |
| 11,054,581 | B2 | 7/2021 | Ayres et al. | |
| 2017/0299864 | A1 * | 10/2017 | Vallius | G02B 27/0081 |
| 2018/0210146 | A1 * | 7/2018 | Klug | G02B 6/00 |
| 2019/0056593 | A1 * | 2/2019 | Bablumyan | G02B 27/44 |

FOREIGN PATENT DOCUMENTS

WO 2019079014 A1 4/2019

* cited by examiner

*Primary Examiner* — Michael Stahl
(74) *Attorney, Agent, or Firm* — Treyz Law Group, P.C.; Michael H. Lyons

(57) ABSTRACT

A display may include a waveguide, projector that produces light, and an input coupler that couples the light into the waveguide. To maximize luminance uniformity, the display may include structures that perform one-dimensional pupil replication on the image light in a direction orthogonal to the direction of propagation. The structures may include a substrate stacked on the waveguide and having a pupil replication layer and light redirecting layer, may include crossed gratings that direct portions of the light to two pupil replication layers that are disposed within or on the waveguide, or may include an array of micromirrors in the projector that diffract illumination light in different diffractive modes to perform one-dimensional pupil replication.

19 Claims, 6 Drawing Sheets

DISPLAY DEVICES WITH ONE-DIMENSIONAL PUPIL REPLICATION

This application claims the benefit of U.S. Provisional Patent Application No. 63/409,400, filed Sep. 23, 2022, which is hereby incorporated by reference herein in its entirety.

BACKGROUND

This disclosure relates to optical systems such as optical systems in electronic devices having displays.

Electronic devices can include displays that provide images near the eyes of a user. Such electronic devices often include virtual or augmented reality headsets with displays having optical elements that allow users to view the displays.

If care is not taken, components used to display images can be bulky and might not exhibit desired levels of optical performance. For example, if care is not taken, the images may exhibit sub-optimal luminance uniformity.

SUMMARY

An electronic device may have a display system for providing image light to an eye box. The display system may include a waveguide and a projector. The projector may produce image light. An input coupler may couple the image light into the waveguide. To minimize image gaps and maximize luminance uniformity, the display may include structures that perform one-dimensional pupil replication on the image light in a direction orthogonal to the direction of propagation.

For example, a substrate may be mounted to the waveguide. The substrate may have first and second surfaces. A pupil replication layer may be disposed between the first surface and the waveguide. A light redirecting layer may be layered onto the second surface. The image light may pass through the second surface and the substrate to the pupil replication layer. The pupil replication layer may redirect the image light onto multiple output angles that lie within a plane, thereby performing one-dimensional pupil replication. The light redirecting layer may direct the image light towards the input coupler through the waveguide. As another example, the input coupler may include crossed gratings that direct portions of the image light to two pupil replication layers that are disposed within or on the waveguide. As another example, the projector may include an array of micromirrors that diffract illumination light in different diffractive modes to perform one-dimensional pupil replication.

DETAILED DESCRIPTION

Figure 1:
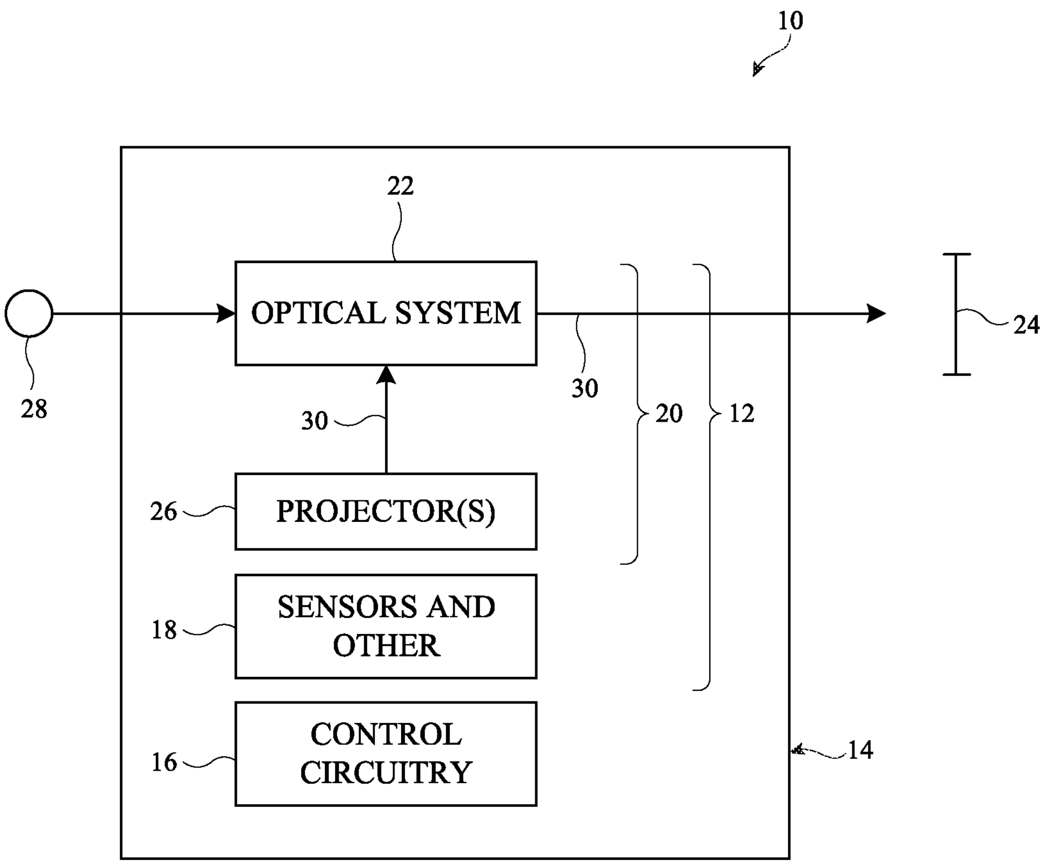
FIG. 1 is a diagram of an illustrative system having a display in accordance with some embodiments.

System 10 of FIG. 1 may be a head-mounted device having one or more displays. The displays in system 10 may include near-eye displays 20 mounted within support structure (housing) 14. Support structure 14 may have the shape of a pair of eyeglasses or goggles (e.g., supporting frames), may form a housing having a helmet shape, or may have other configurations to help in mounting and securing the components of near-eye displays 20 on the head or near the eye of a user. Near-eye displays 20 may include one or more display projectors such as projectors 26 (sometimes referred to herein as display modules 26) and one or more optical systems such as optical systems 22. Projectors 26 may be mounted in a support structure such as support structure 14. Each projector 26 may emit image light 30 that is redirected towards a user's eyes at eye box 24 using an associated one of optical systems 22. Image light 30 may be, for example, light that contains and/or represents something viewable such as a scene or object (e.g., as modulated onto the image light using the image data provided by the control circuitry to the display module).

The operation of system 10 may be controlled using control circuitry 16. Control circuitry 16 may include storage and processing circuitry for controlling the operation of system 10. Circuitry 16 may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 16 may be based on one or more microprocessors, microcontrollers, digital signal processors, baseband processors, power management units, audio chips, graphics processing units, application specific integrated circuits, and other integrated circuits. Software code may be stored on storage in circuitry 16 and run on processing circuitry in circuitry 16 to implement operations for system 10 (e.g., data gathering operations, operations involving the adjustment of components using control signals, image rendering operations to produce image content to be displayed for a user, etc.).

System 10 may include input-output circuitry such as input-output devices 12. Input-output devices 12 may be used to allow data to be received by system 10 from external equipment (e.g., a tethered computer, a portable device such as a handheld device or laptop computer, or other electrical equipment) and to allow a user to provide head-mounted device 10 with user input. Input-output devices 12 may also be used to gather information on the environment in which system 10 (e.g., head-mounted device 10) is operating. Output components in devices 12 may allow system 10 to provide a user with output and may be used to communicate with external electrical equipment. Input-output devices 12 may include sensors and other components 18 (e.g., image sensors for gathering images of real-world object that are digitally merged with virtual objects on a display in system 10, accelerometers, depth sensors, light sensors, haptic output devices, speakers, batteries, wireless communications circuits for communicating between system 10 and external electronic equipment, etc.).

Projectors 26 may include liquid crystal displays, organic light-emitting diode displays, laser-based displays, or displays of other types. Projectors 26 may include light sources, emissive display panels, transmissive display panels that are illuminated with illumination light from light sources to produce image light, reflective display panels such as digital micromirror display (DMD) panels and/or liquid crystal on silicon (LCOS) display panels that are illuminated with illumination light from light sources to produce image light 30, etc.

Optical systems 22 may form lenses that allow a viewer (see, e.g., a viewer's eyes at eye box 24) to view images on display(s) 20. There may be two optical systems 22 (e.g., for forming left and right lenses) associated with respective left and right eyes of the user. A single display 20 may produce images for both eyes or a pair of displays 20 may be used to display images. In configurations with multiple displays (e.g., left and right eye displays), the focal length and positions of the lenses formed by system 22 may be selected so that any gap present between the displays will not be visible to a user (e.g., so that the images of the left and right displays overlap or merge seamlessly).

If desired, optical system 22 may contain components (e.g., an optical combiner, etc.) to allow real-world image light from real-world images or objects (e.g., real-world objects 28) to be combined optically with virtual (computer-generated) images such as virtual images in image light 30. In this type of system, which is sometimes referred to as an augmented reality system, a user of system 10 may view both real-world content and computer-generated content that is overlaid on top of the real-world content. Camera-based augmented reality systems may also be used in device 10 (e.g., in an arrangement in which a camera captures real-world images of external objects and this content is digitally merged with virtual content at optical system 22).

System 10 may, if desired, include wireless circuitry and/or other circuitry to support communications with a computer or other external equipment (e.g., a computer that supplies display 20 with image content). During operation, control circuitry 16 may supply image content to display 20. The content may be remotely received (e.g., from a computer or other content source coupled to system 10) and/or may be generated by control circuitry 16 (e.g., text, other computer-generated content, etc.). The content that is supplied to display 20 by control circuitry 16 may be viewed by a viewer at eye box 24.

Figure 2:
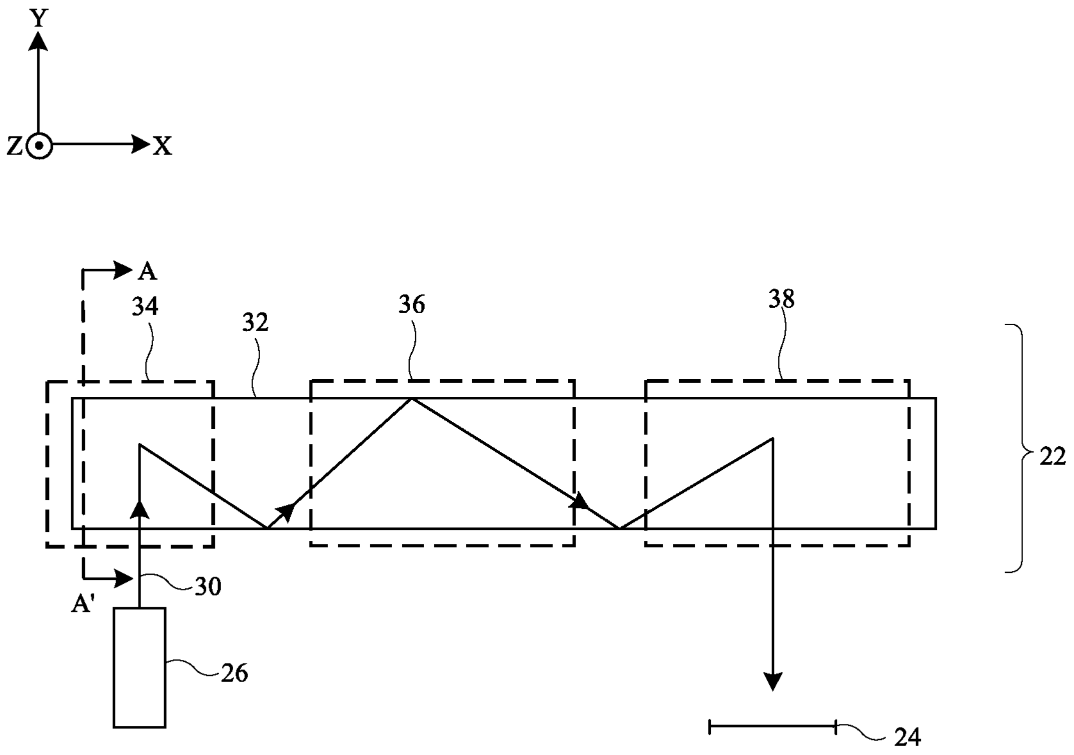
FIG. 2 is a top view of an illustrative optical system for a display having a waveguide with optical couplers in accordance with some embodiments.

FIG. 2 is a top view of an illustrative display 20 that may be used in system 10 of FIG. 1. As shown in FIG. 2, display 20 may include a projector such as projector 26 and an optical system such as optical system 22. Optical system 22 may include optical elements such as one or more waveguides 32. Waveguide 32 may include one or more stacked substrates (e.g., stacked planar and/or curved layers sometimes referred to herein as waveguide substrates) of optically transparent material such as plastic, polymer, glass, etc.

If desired, waveguide 32 may also include one or more layers of holographic recording media (sometimes referred to herein as holographic media, grating media, or diffraction grating media) on which one or more diffractive gratings are recorded (e.g., holographic phase gratings, sometimes referred to herein as holograms, surface relief gratings, etc.). A holographic recording may be stored as an optical interference pattern (e.g., alternating regions of different indices of refraction) within a photosensitive optical material such as the holographic media. The optical interference pattern may create a holographic phase grating that, when illuminated with a given light source, diffracts light to create a three-dimensional reconstruction of the holographic recording. The holographic phase grating may be a non-switchable diffractive grating that is encoded with a permanent interference pattern or may be a switchable diffractive grating in which the diffracted light can be modulated by controlling an electric field applied to the holographic recording medium. Multiple holographic phase gratings (holograms) may be recorded within (e.g., superimposed within) the same volume of holographic medium if desired. The holographic phase gratings may be, for example, volume holograms or thin-film holograms in the grating medium. The grating medium may include photopolymers, gelatin such as dichromated gelatin, silver halides, holographic polymer dispersed liquid crystal, or other suitable holographic media.

Diffractive gratings on waveguide 32 may include holographic phase gratings such as volume holograms or thin-film holograms, meta-gratings, or any other desired diffractive grating structures. The diffractive gratings on waveguide 32 may also include surface relief gratings (SRGs) formed on one or more surfaces of the substrates in waveguide 32 (e.g., as modulations in thickness of a SRG medium layer), gratings formed from patterns of metal structures, etc. The diffractive gratings may, for example, include multiple multiplexed gratings (e.g., holograms) that at least partially overlap within the same volume of grating medium (e.g., for diffracting different colors of light and/or light from a range of different input angles at one or more corresponding output angles). Other light redirecting elements such as louvered mirrors may be used in place of diffractive gratings in waveguide 32 if desired.

As shown in FIG. 2, projector 26 may generate (e.g., produce and emit) image light 30 associated with image content to be displayed to eye box 24 (e.g., image light 30 may convey a series of image frames for display at eye box 24). Image light 30 may be collimated using a collimating lens in projector 26 if desired. Optical system 22 may be used to present image light 30 output from projector 26 to eye box 24. If desired, projector 26 may be mounted within support structure 14 of FIG. 1 while optical system 22 may be mounted between portions of support structure 14 (e.g., to form a lens that aligns with eye box 24). Other mounting arrangements may be used, if desired.

Optical system 22 may include one or more optical couplers (e.g., light redirecting elements) such as input coupler 34, cross-coupler 36, and output coupler 38. In the example of FIG. 2, input coupler 34, cross-coupler 36, and output coupler 38 are formed at or on waveguide 32. Input coupler 34, cross-coupler 36, and/or output coupler 38 may be completely embedded within the substrate layers of waveguide 32, may be partially embedded within the substrate layers of waveguide 32, may be mounted to waveguide 32 (e.g., mounted to an exterior surface of waveguide 32), etc.

Waveguide 32 may guide image light 30 down its length via total internal reflection. Input coupler 34 may be configured to couple image light 30 from projector 26 into waveguide 32 (e.g., within a total-internal reflection (TIR) range of the waveguide within which light propagates down the waveguide via TIR), whereas output coupler 38 may be configured to couple image light 30 from within waveguide 32 (e.g., propagating within the TIR range) to the exterior of waveguide 32 and towards eye box 24 (e.g., at angles outside of the TIR range). Input coupler 34 may include an input coupling prism, an edge or face of waveguide 32, a lens, a steering mirror or liquid crystal steering element, diffractive grating structures (e.g., volume holograms, SRGs, etc.), partially reflective structures (e.g., louvered mirrors), or any other desired input coupling elements.

As an example, projector 26 may emit image light 30 in direction +Y towards optical system 22. When image light 30 strikes input coupler 34, input coupler 34 may redirect image light 30 so that the light propagates within waveguide 32 via total internal reflection towards output coupler 38 (e.g., in direction +X within the TIR range of waveguide 32). When image light 30 strikes output coupler 38, output coupler 38 may redirect image light 30 out of waveguide 32 towards eye box 24 (e.g., back along the Y-axis). In implementations where cross-coupler 36 is formed on waveguide 32, cross-coupler 36 may redirect image light 30 in one or more directions as it propagates down the length of waveguide 32 (e.g., towards output coupler 38 from a direction of propagation as coupled into the waveguide by the input coupler). In redirecting image light 30, cross-coupler 36 may also perform pupil expansion on image light 30 in one or more directions. In expanding pupils of the image light, cross-coupler 36 may, for example, help to reduce the vertical size of waveguide 32 (e.g., in the Z direction) relative to implementations where cross-coupler 36 is omitted. Cross-coupler 36 may therefore sometimes also be referred to herein as pupil expander 36 or optical expander 36. If desired, output coupler 38 may also expand image light 30 upon coupling the image light out of waveguide 32.

Input coupler 34, cross-coupler 36, and/or output coupler 38 may be based on reflective and refractive optics or may be based on diffractive (e.g., holographic) optics. In arrangements where couplers 34, 36, and 38 are formed from reflective and refractive optics, couplers 34, 36, and 38 may include one or more reflectors (e.g., an array of micromirrors, partial mirrors, louvered mirrors, or other reflectors). In arrangements where couplers 34, 36, and 38 are based on diffractive optics, couplers 34, 36, and 38 may include diffractive gratings (e.g., volume holograms, surface relief gratings, etc.).

In general, it may be desirable to fill as large an eye box 24 as possible with image light 30 having as uniform a luminosity across the area of the eye box as possible. If care is not taken, directing image light 30 to eye box 24 may cause the image light to exhibit sub-optimal luminance uniformity (e.g., with image gaps present in the image light at the eye box). To fill as large an eye box 24 as possible with maximal luminance uniformity (e.g., with minimal image gaps), optical system 22 may be provided with a pupil expander at or on waveguide 32 (e.g., a pupil expander separate from cross-coupler 36 and output coupler 38). The pupil expander may, for example, be a one-dimensional pupil expander that increases (expands) the pupil size of image light 30 along a single dimension to improve luminance uniformity over the image.

Figure 3:
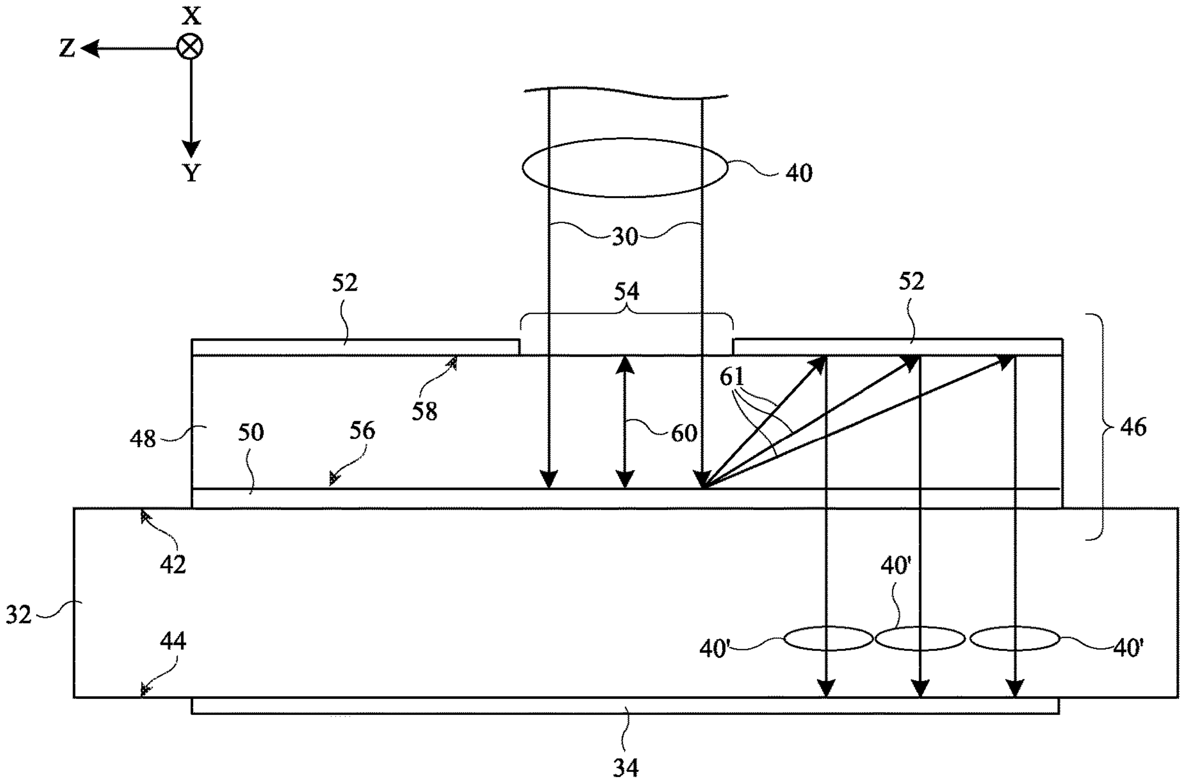
FIG. 3 is a cross-sectional side view of an illustrative waveguide having a one-dimensional pupil expander with a substrate mounted to the waveguide in accordance with some embodiments.

FIG. 3 is a cross-sectional side view (e.g., as taken along line AA' of FIG. 2) showing one example of how a one waveguide 32 may be provided with a one-dimensional pupil expander for operating on image light 30. As shown in FIG. 3, waveguide 32 may have a first (lateral) surface 42 (e.g., facing projector 26 and eye box 24 of FIG. 2) and may have an opposing second (lateral) surface 44 (e.g., facing the scene in front of the display). Surfaces 42 and 44 may sometimes be referred to herein as waveguide surfaces. Surfaces 42 and 44 may be surfaces of the same waveguide substrate, as shown in the example of FIG. 3. In other implementations, surfaces 42 and 44 may be surfaces of two different respective waveguide substrates (e.g., where a layer of grating medium is interposed between the waveguide substrates for forming one or more optical couplers for the display).

In the example of FIG. 3, input coupler 34 is layered onto surface 44 of waveguide 32. Input coupler 34 may, for example, include diffractive grating structures (e.g., volume holograms, metagratings, a surface relief grating, etc.) or reflective structures (e.g., louvered partially reflective mirrors) in a medium layer on surface 44. In other implementations, input coupler 34 may include an input coupling prism, may be layered onto surface 42 of waveguide 32, or may be embedded within waveguide 32 (e.g., in a medium layer between first and second waveguide substrates).

As shown in FIG. 3, a pupil 40 of image light 30 may be incident upon waveguide 32 (e.g., from projector 26 of FIG. 2). Waveguide 32 may be provided with a pupil expander 46. Pupil expander 46 may be a one-dimensional pupil expander that replicates the pupil of image light 30 along a single dimension that is orthogonal to the propagation direction of image light 30 within waveguide 32. Pupil expander 46 may therefore sometimes also be referred to herein as one-dimensional pupil expander 46.

Pupil expander 46 may be mounted to surface 42 of waveguide 32. Pupil expander 46 may include a substrate 48 (e.g., a transparent substrate or duct) having an elongated shape that extends along a longitudinal axis parallel to the Z-axis of FIG. 3. Substrate 48 may have a first (lateral) surface 58 and a second (lateral) surface 56 opposite surface 58. Pupil expander 46 may include a pupil replication layer 50 on surface 56 and a light redirecting layer 52 on surface 56. Surface 56 of substrate 48 may be mounted to (stacked onto) surface 42 of waveguide 32. Pupil replication layer 50 may be interposed (sandwiched) between substrate 48 and surface 42 of waveguide 32.

Light redirecting layer 52 may have an opening such as aperture 54 at surface 58 of substrate 48. Aperture 54 may receive the pupil 40 of image light 30. The pupil 40 of image light 30 may pass through aperture 54 and surface 58 of substrate 48 to pupil replication layer 50. Pupil replication layer 50 may redirect (e.g., diffract or reflect) image light 30 incident from a particular incident angle (e.g., from aperture 54) onto multiple different output (reflected) angles, as shown by arrows 61 (e.g., output angles oriented towards light redirecting layer 52). This may serve to effectively replicate pupil 40 of image light 30 at each of the output angles of pupil replication layer 50, thereby producing replicated pupils 40'. The output angles may be selected to lie within a plane that is perpendicular to the subsequent direction of propagation of image light 30 via TIR in waveguide 32 (e.g., within the Z-Y plane of FIG. 3). In this way, the pupil replication occurs in one dimension along a single axis (e.g., the Z-axis of FIG. 3).

Pupil replication layer 50 (sometimes referred to herein as pupil replicating layer 50) may include, for example, one or more diffractive gratings (e.g., a surface relief grating, a set of volume holograms, etc.) in a medium layer between substrate 48 and waveguide 32, where the diffractive grating(s) are configured to diffract image light 30 from a single incident angle (from aperture 54) onto multiple different output angles (e.g., as given by the Bragg-matching conditions of the diffractive grating(s)). As another example, pupil replication layer 50 may include louvered mirrors or other reflective structures in a medium layer between substrate 48 and waveguide 32.

Substrate 48 may have a thickness 60 (e.g., parallel to the Y axis). Thickness 60 may determine the spacing between replicated pupils 40'. Greater thicknesses 60 may produce wider spacing between replicated pupils 40' than lesser thicknesses 60, for example. In this way, thickness 60 may control the degree of pupil expansion independent of waveguide 32.

Light redirecting layer 52 may redirect (e.g., diffract or reflect) replicated pupils 40' of the image light 30 incident from each of the output angles of pupil replication layer 50 towards input coupler 34 through waveguide 32 (e.g., onto the same output angle in the +Y direction). While image light 30 propagates within waveguide 32 via TIR, if desired, image light 30 may not propagate via TIR within substrate 48. Light redirecting layer 52 may include, for example, one or more diffractive gratings (e.g., a surface relief grating, a set of volume holograms, etc.) in a medium layer on surface 58 of substrate 48, where the diffractive grating(s) are configured to diffract image light 30 from multiple incident angles (e.g., corresponding to the multiple output angles of pupil replication layer 50 and shown by arrows 61) towards input coupler 34 (e.g., onto a single output angle, as given by the Bragg-matching conditions of the diffractive grating(s)). As another example, light redirecting layer 52 may include louvered mirrors or other reflective structures in a medium layer on surface 58 of substrate 48.

Input coupler 34 may then redirect (e.g., reflect or diffract) replicated pupils 40' of image light 30 into waveguide 32 within the TIR range of the waveguide, thereby coupling the replicated pupils 40' of image light 30 into waveguide 32. Input coupler 34 may couple image light 30 into waveguide 32 such that the image light 30 propagates down waveguide 32 in a propagation direction (e.g., in the +X direction towards cross-coupler 36 and/or output coupler 38 of FIG. 2) that is orthogonal to the axis with which pupil replication layer 50 replicates the pupil 40 of image light 30.

Figure 4:
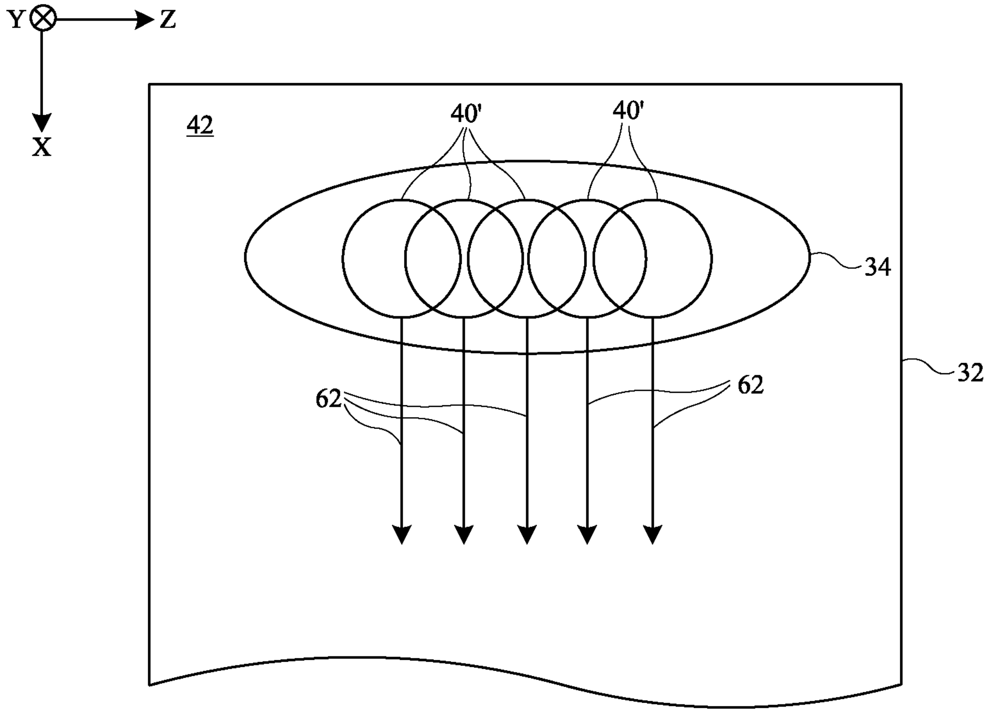
FIG. 4 is a front view showing how an illustrative one-dimensional pupil expander may provide replicated pupils of image light to a waveguide in accordance with some embodiments.

FIG. 4 is a front view (e.g., as taken in the +Y direction of FIG. 3) showing how replicated pupils 40' may be coupled into waveguide 32. Pupil expander 46 has been omitted from FIG. 4 for the sake of clarity. As shown in FIG. 4, replicated pupils 40' of image light 30 may be incident upon input coupler 34. If desired, input coupler 34 may be an elongated input coupler having an elongated shape (lateral outline) that is longer in a first dimension (e.g., in the direction of pupil replication) than in a second dimension (e.g., in the direction of propagation of image light 30 in waveguide 32). Input coupler 34 may, for example, have an elliptical or oval lateral outline. The elongated shape may configure input coupler 34 to receive each of the replicated pupils along the axis of replication.

Input coupler 34 may then couple the image light into waveguide 32 in the corresponding propagation direction, as shown by arrows 62 (e.g., towards cross-coupler 36 and/or output coupler 38 of FIG. 2 or towards an interleaved coupler that performs both cross coupler and output coupler functions). By replicating pupils of image light 30 in one dimension (e.g., along the Z-axis) and then coupling the image light into waveguide 32 in a propagation direction orthogonal to that dimension (as shown by arrows 62), the image light may exhibit minimal image gaps in the direction of replication and thus optimal luminance uniformity by the time the image light reaches eye box 24 (FIG. 2).

The example of FIGS. 3 and 4 is merely illustrative. If desired, pupil replication layer 50 and/or light redirecting layer 52 may be embedded within substrate 48. If desired, pupil expander 46 may be mounted to surface 44 of waveguide 32 instead of surface 42. If desired, pupil replication layer 50 may include transmissive diffractive gratings that transmit replicated pupils of image light directly into waveguide 32 towards input coupler 34 and light redirecting layer 52 may be omitted. If desired, substrate 48 may be omitted from pupil expander 46 and pupil expander 46 may be integrated into waveguide 32.

Figure 5:
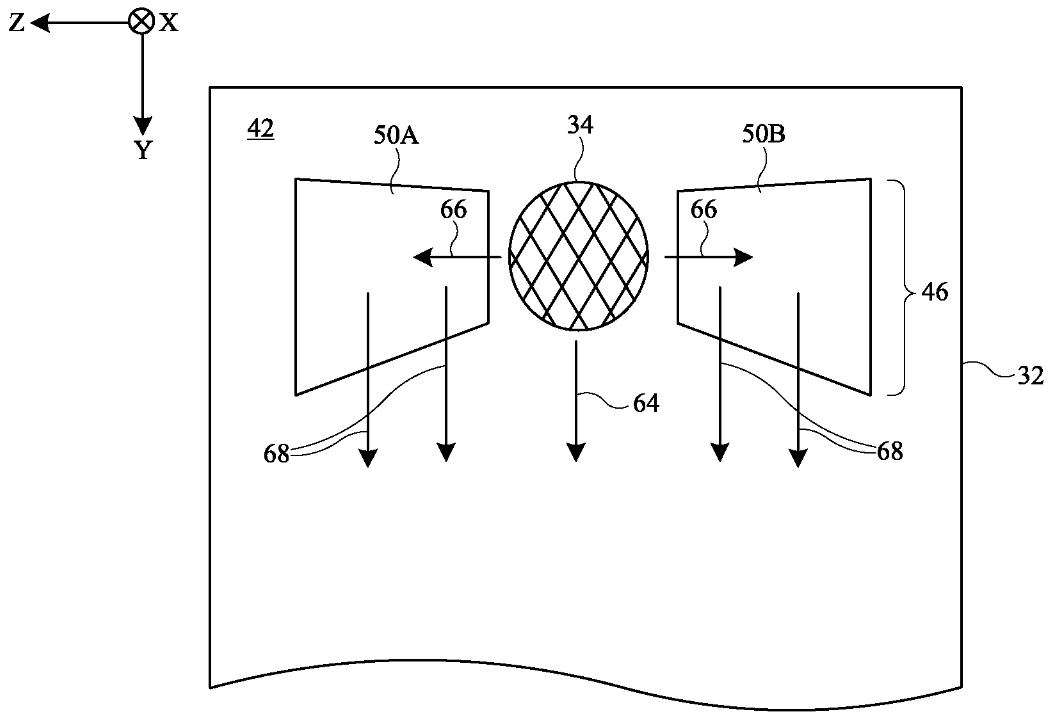
FIG. 5 is a front view of an illustrative waveguide having a one-dimensional pupil expander in the waveguide in accordance with some embodiments.

FIG. 5 is a front view (e.g., as viewed in the +Y direction of FIG. 2) showing one example of how pupil expander 46 may be integrated into waveguide 32 without the use of an additional substrate 48. As shown in FIG. 5, pupil expander 46 may include a first pupil replication layer 50A and a second pupil replication layer 50B on opposing sides of input coupler 34 (e.g., replication layers 50A and 50B may be coplanar and input coupler 34 may be laterally interposed between replication layers 50A and 50B). Pupil replication layers 50A and 50B may be layered onto surface 42 of waveguide 32, onto surface 44 of waveguide 32 (FIG. 3), or may be embedded within waveguide 32.

Input coupler 34 may redirect incident image light 30 in a first direction (e.g., in the propagation direction), as shown by arrow 64, and along the Z-axis towards pupil replication layers 50A and 50B, as shown by arrows 66. Input coupler 34 may, for example, include crossed gratings with weak diffraction orders in the +Z and −Z directions. The crossed gratings may be layered onto surface 42 of waveguide 32, may be layered onto surface 44 of waveguide 32 (FIG. 3), or may be embedded within waveguide 32.

Pupil replication layers 50A and 50B may replicate pupils of the image light received from input coupler 34 along a single axis (e.g., the Z-axis) and may redirect the replicated pupils downwards in the propagation direction of waveguide 32, as shown by arrows 68. In this way, pupil expander 46 may be integrated into waveguide 32 without requiring an additional substrate layer on waveguide 32.

Figure 6:
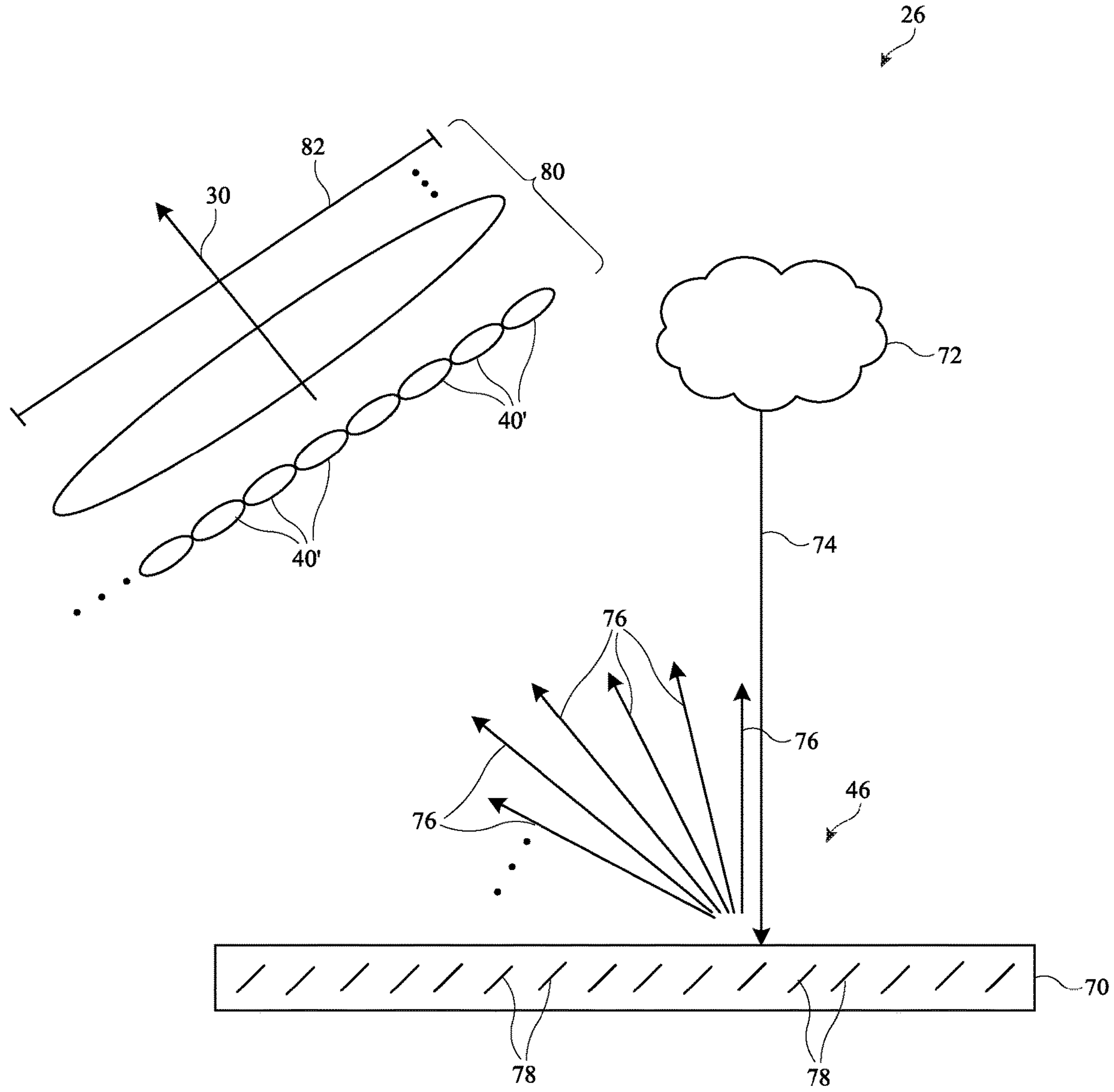
FIG. 6 is a diagram showing how an illustrative projector may include a reflective display panel that serves as a one-dimensional pupil expander in accordance with some embodiments.

Additionally or alternatively, projector 26 may include a reflective display panel that serves as a one-dimensional pupil expander for image light 30. FIG. 6 is a diagram showing one example of how projector 26 may include a reflective display panel that serves as a one-dimensional pupil expander for image light 30. As shown in FIG. 6, projector 26 may include illumination optics 72, a reflective display panel such as reflective display panel 70, and output optics 80. Output optics 80 may include one or more collimating lenses (sometimes referred to herein as eyepiece optics), lens elements, prisms, optical wedges, reflective polarizers, reflectors, and/or any other desired optical components for emitting image light 30 from projector 26. Output optics 80 may define an output aperture 82 for projector 26. Projector 26 emits image light 30 through output aperture 82 (sometimes referred to herein as projector aperture 82).

Illumination optics 72 may include one or more light sources such as LED light sources, OLED light sources, uLED light sources, laser light sources, or any other desired light sources. Illumination optics 72 may also include optical components (e.g., prisms, optical wedges, partial reflectors, reflective polarizers, an X-cube, etc.) that combine light from different light sources in illumination optics 72 (e.g., light of different wavelength ranges from different colored light sources) to produce illumination light 74 and to direct illumination light 74 towards reflective display panel 70. Illumination light 74 may include light in one or more wavelength bands (e.g., red, green, and/or blue wavelength bands).

Reflective display panel 70 (e.g., a reflective spatial light modulator) may be an LCOS display panel, a DMD display panel, a ferroelectric LCOS (fLCOS) panel, or other types of reflective display panel. Implementations in which reflective display panel 70 is a DMD panel are described herein as an example. Reflective display panel 70 may therefore sometimes be referred to herein as DMD panel 70.

DMD panel 70 may have an array of individually adjustable pixels. Each pixel may be formed by a respective reflective element 78 in the array. Reflective elements 78 may be electrically adjustable (steerable) mirrors such as micromirrors (e.g., micro-electromechanical-systems (MEMS)-based micromirrors). Reflective elements 78 may therefore sometimes be referred to herein as micromirrors 78 or mirrors 78. Each mirror 78 may form a respective pixel for DMD panel 70. If desired, DMD panel 70 may include a transparent cover layer that covers (overlaps) each of the mirrors 78.

Illumination optics 72 may provide illumination light 74 to mirrors 78 at an incident angle. During operation, control circuitry 16 (FIG. 1) may control DMD panel 70 to selectively reflect illumination light 74 at each pixel (mirror) location to produce image light 30 (e.g., image light having an image as modulated onto (using) the illumination light by the mirrors 78 in DMD 70). Output optics 80 may transmit image light 30 towards input coupler 34 on waveguide 32 through output aperture 82.

Mirrors 78 in DMD panel 70 are very small and are spaced very closely together. As such, the mirrors 78 in DMD panel 70 may collectively form a diffractive grating at visible wavelengths and thus for the incident illumination light 74 received from illumination optics 72. The array of mirrors 78 may thereby diffract incident illumination light 74 (e.g., as image light) in a number of different diffractive modes 76. Each diffractive mode 76 diffracts some of the incident illumination light 74 in a different respective direction.

Output optics 80 may be configured to receive the diffracted light from DMD panel 70 in two or more of the diffractive modes. The sizing and spacing of mirrors 78 in DMD panel 70 may be selected such that each of the diffractive modes 76 that provide light to output optics 80 forms a different respective replicated pupil 40' of image light 30, where each of the replicated pupils is aligned along a single one-dimensional axis that is perpendicular to the direction of propagation of the image light (thereby reducing image gaps along the one-dimensional axis). Output optics 80 may direct the replicated pupils 40' of image light 30 towards input coupler 34 on waveguide 32 (e.g., the elongated input coupler 34 of FIG. 4). In other words, DMD panel 70 itself may form a one-dimensional pupil expander 46 for the display that performs one-dimensional pupil replication for image light 30 prior to the image light arriving at the waveguide. If desired, mirrors 78 may also be spaced to modulate the phase of the light to obtain any desired diffraction (pupil pattern).

The foregoing is merely illustrative and various modifications can be made to the described embodiments. The foregoing embodiments may be implemented individually or in any combination.

What is claimed is:

1. An electronic device comprising:

a waveguide;

a substrate mounted to the waveguide, wherein the substrate has a first surface and a second surface opposite the first surface, the substrate being configured to receive light through the second surface;

a first layer disposed between the first surface of the substrate and the waveguide and configured to receive the light through the substrate, wherein the first layer comprises a surface relief grating or a louvered mirror;

a second layer disposed on the second surface of the substrate, wherein the first layer is configured to redirect the light towards the second layer at a plurality of output angles, the second layer being configured to redirect the light from the plurality of output angles into the waveguide through the first surface; and an input coupler configured to receive the light from the second layer and configured to couple the light into the waveguide.

2. The electronic device of claim 1, wherein the plurality of output angles lie within a plane and the input coupler is configured to couple the light into the waveguide in a propagation direction that is orthogonal to the plane.

3. The electronic device of claim 1, wherein the second layer comprises a surface relief grating.

4. The electronic device of claim 1, wherein the second layer comprises volume holograms.

5. The electronic device of claim 1, wherein the second layer comprises a louvered mirror.

6. The electronic device of claim 1, wherein the waveguide has a third surface and a fourth surface opposite the third surface, the first layer being in contact with the first surface and the third surface.

7. The electronic device of claim 6, wherein the input coupler is layered on the fourth surface.

8. The electronic device of claim 7, wherein the input coupler has an elliptical lateral outline.

9. The electronic device of claim 1, wherein the second layer has an opening that is aligned with a pupil of the light and the first layer is configured to replicate the pupil by redirecting the light towards the second layer at the plurality of output angles.

10. An electronic device comprising:

a waveguide;

first and second layers on the waveguide; and crossed gratings laterally interposed between the first and second layers on the waveguide, wherein the crossed gratings are configured to receive light, the crossed gratings are configured to diffract a first portion of the light in a first direction, the crossed gratings are configured to diffract a second portion of the light towards the first layer in a second direction orthogonal to the first direction, the crossed gratings are configured to diffract a third portion of the light towards the second layer in a third direction opposite the second direction, the first layer is configured to replicate a pupil of the second portion of the light and is configured to redirect the second portion of the light in the first direction, wherein the first layer comprises a first set of volume holograms or a first louvered mirror, and the second layer is configured to replicate a pupil of the third portion of the light and is configured to redirect the third portion of the light in the first direction, wherein the second layer comprises a second set of volume holograms or a second louvered mirror.

11. The electronic device of claim 10, wherein the waveguide is configured to propagate the first, second, and third portions of the light in the first direction, the electronic device further comprising:

an optical coupler configured to receive the first, second, and third portions of the light and configured to couple the first, second, and third portions of the light out of the waveguide.

12. A display comprising:

a waveguide;

a substrate having a first lateral surface and a second lateral surface opposite the first lateral surface;

optics configured to transmit light into the substrate through the second lateral surface;

a first optical layer interposed between the first lateral surface and the waveguide;

a second optical layer on the second lateral surface, wherein the first optical layer is configured to redirect the light from the substrate and towards the second optical layer at a plurality of output angles, the second optical layer being configured to redirect the light from the plurality of output angles and into the waveguide; and an input coupler configured to redirect the light from the second optical layer onto angles that cause the light to propagate along the waveguide via total internal reflection, wherein the plurality of output angles lie within a plane and the input coupler is configured to couple the light into the waveguide in a propagation direction that is orthogonal to the plane.

13. The display of claim 12, wherein the second optical layer has an opening that is aligned with a pupil of the light and the first optical layer is configured to replicate the pupil by redirecting the light towards the second optical layer at the plurality of output angles.

14. The display of claim 12, wherein the first optical layer comprises a surface relief grating.

15. The display of claim 12, wherein the first optical layer comprises volume holograms.

16. The display of claim 12, wherein the first optical layer comprises a louvered mirror.

17. The display of claim 12, wherein the second optical layer comprises a surface relief grating.

18. The display of claim 12, wherein the second optical layer comprises volume holograms.

19. The display of claim 12, wherein the second optical layer comprises a louvered mirror.

* * * * *